United States Patent
Yun et al.

[11] Patent Number: 6,002,457
[45] Date of Patent: *Dec. 14, 1999

[54] COMPUTER HAVING LIQUID CRYSTAL DISPLAY

[75] Inventors: Hee Young Yun, Kumi; Kyo Hun Moon, Kimcheon; Byeong Yun Lee, Suwon; Yong Bum Kim, Kumi; Young Un Bang, Ansan, all of Rep. of Korea

[73] Assignee: LG LCD, Inc., Rep. of Korea

[*] Notice: This patent is subject to a terminal disclaimer.

[21] Appl. No.: 09/178,832

[22] Filed: Oct. 26, 1998

Related U.S. Application Data

[63] Continuation of application No. 08/888,164, Jul. 3, 1997, Pat. No. 5,835,139.

[30] Foreign Application Priority Data

Apr. 8, 1997 [KR] Rep. of Korea ............. 97-12899
Apr. 17, 1997 [KR] Rep. of Korea ............. 97-14278

[51] Int. Cl.$^6$ .................. G02F 1/1333; H05K 5/001
[52] U.S. Cl. ................... 349/58; 349/1; 301/681
[58] Field of Search .................. 349/1, 52, 187; 301/681

[56] References Cited

U.S. PATENT DOCUMENTS

| | | | |
|---|---|---|---|
| 4,111,533 | 9/1978 | Nakamura et al. | 350/337 |
| 4,165,607 | 8/1979 | Fedorowicz et al. | 58/50 |
| 4,422,728 | 12/1983 | Andreaggi | 350/334 |
| 4,755,035 | 7/1988 | Kopish et al. | 350/345 |
| 4,781,422 | 11/1988 | Kimble | 312/72 |
| 4,937,709 | 6/1990 | Yanagi et al. | 362/31 |
| 4,959,887 | 10/1990 | Gruenberg et al. | 16/223 |
| 5,102,084 | 4/1992 | Park | 248/286 |
| 5,103,377 | 4/1992 | Kobayashi et al. | 361/394 |
| 5,168,426 | 12/1992 | Hoving et al. | 361/392 |
| 5,173,837 | 12/1992 | Blackwell et al. | 361/380 |
| 5,195,213 | 3/1993 | Ohgami et al. | 16/342 |

(List continued on next page.)

FOREIGN PATENT DOCUMENTS

| | | |
|---|---|---|
| 0317261 | 5/1989 | European Pat. Off. . |
| 425793 | 6/1991 | European Pat. Off. . |
| 0 454 120 | 10/1991 | European Pat. Off. . |
| 0532284 | 3/1993 | European Pat. Off. . |
| 0604872 | 7/1994 | European Pat. Off. . |
| 4120950 | 12/1992 | Germany . |
| 1-237591 | 9/1989 | Japan . |
| 1-237591A | 9/1989 | Japan . |
| 05080334 | 2/1993 | Japan . |
| 07199180 | 8/1995 | Japan . |
| 07281184 | 10/1995 | Japan . |
| 2305689 | 4/1997 | United Kingdom . |
| 2305690 | 4/1997 | United Kingdom . |

OTHER PUBLICATIONS

"14.2" XGA (Ver. 2) Technical Data, AA142XB11, Advanced Display Inc.

Structure Design for Liquid Crystal Display Module, IBM Technical Disclosure Bulletin, vol. 39, No. 1, Jan. 1996, S. 71–73.

High Efficiency Back Light for LCD, IBM Technical Disclosure Bulletin, vol. 33, No. 9, Feb. 1991, S. 261, 262.

JP2–79893 Patents Abstracts of Japan, P–1061, Jun. 13, 1990, vol. 14, No. 274.

IBM Technical Disclosure Bulletin, vol. 37, No. 12, Dec. 1994 entitled "Cell Support Assembly without Screw".

*Primary Examiner*—William L. Sikes
*Assistant Examiner*—Toan Ton
*Attorney, Agent, or Firm*—Long Aldridge & Norman

[57] ABSTRACT

A liquid crystal display device includes a liquid crystal panel having a display area, a light source joined with the liquid crystal panel, a first frame coupled to a surface of the light unit and sides of the liquid crystal panel, a second frame coupled to edges of the liquid crystal panel and sides of the first support frame, an outer casing, and a fastening part joining together the first support frame, the second support frame, and the outer casing through the sides of the first support frame, the second support frame, and the outer casing.

52 Claims, 7 Drawing Sheets

U.S. PATENT DOCUMENTS

| | | | |
|---|---|---|---|
| 5,216,411 | 6/1993 | Ashitomi et al. | 349/58 |
| 5,233,502 | 8/1993 | Beatty et al. | 349/58 |
| 5,238,421 | 8/1993 | Kobayashi | 439/165 |
| 5,276,589 | 1/1994 | Bartlett et al. | 361/681 |
| 5,328,379 | 7/1994 | Kobayashi | 439/165 |
| 5,432,626 | 7/1995 | Sasuga et al. | 359/83 |
| 5,467,504 | 11/1995 | Yang | 16/342 |
| 5,494,447 | 2/1996 | Zaidan | 361/681 |
| 5,504,605 | 4/1996 | Sukuma et al. | 359/83 |
| 5,559,670 | 9/1996 | Flint et al. | 361/681 |
| 5,566,048 | 10/1996 | Esterberg et al. | 361/681 |
| 5,634,351 | 6/1997 | Larson et al. | 62/259.2 |
| 5,636,101 | 6/1997 | Bonsall et al. | 361/681 |
| 5,636,102 | 6/1997 | Fujino et al. | 361/681 |
| 5,654,779 | 8/1997 | Nakayama et al. | 349/58 |
| 5,666,172 | 9/1997 | Ida et al. | 349/58 |
| 5,680,183 | 10/1997 | Sasuga et al. | 349/58 |
| 5,682,645 | 11/1997 | Watabe et al. | 16/338 |
| 5,771,539 | 6/1998 | Wahlstedt et al. | 16/285 |

COMPUTER HAVING LIQUID CRYSTAL DISPLAY

This is a continuation of application Ser. No. 08/888,164 filed Jul. 3, 1997, now U.S. Pat. No. 5,835,139 which application is hereby incorporated by reference in its entirety.

This application claims the benefit of Korean Application No. 12899/1997 filed on Apr. 8, 1997, and Korean Application No. 14278/1997 filed on Apr. 17, 1997, which are hereby incorporated by reference.

BACKGROUND OF THE INVENTION

1. Field of the Invention

The present invention relates to a computer, and more particularly, to a display unit of a portable computer.

2. Discussion of the Related Art

Figure 1:
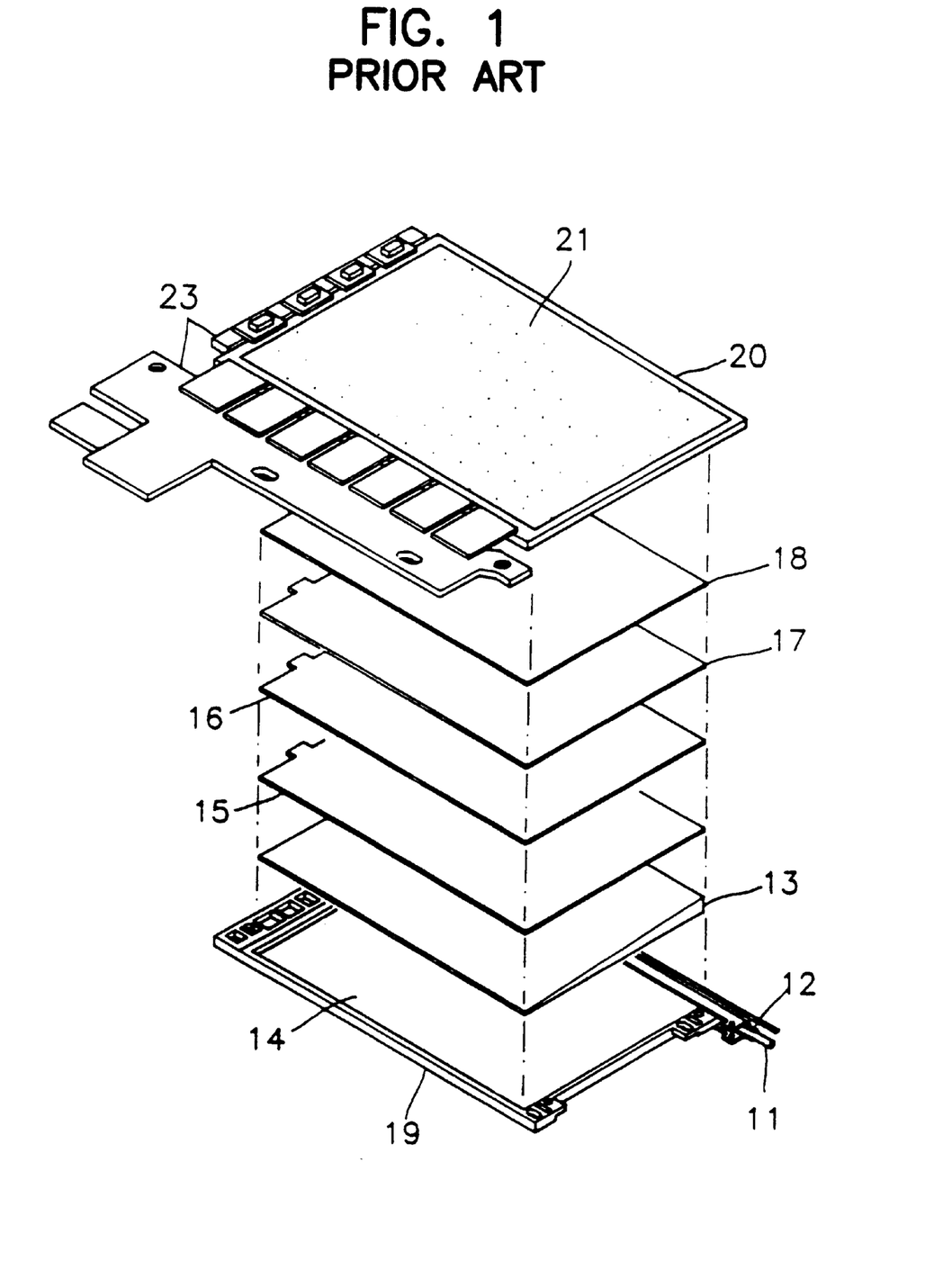
FIG. 1 is a perspective drawing showing the structure of the conventional liquid crystal display device.

In general, a liquid crystal display (LCD) device used for a computer such as a portable computer or for a portable display is shown in FIG. 1. Referring to FIG. 1, the LCD device includes a liquid crystal panel 20, a back light unit, and a driving circuit board 23. The back light unit is comprised of a luminescent lamp 11, a lamp housing 12 having a U-shape and surrounding the lamp 11, a light guide 13, a reflector 14 reflecting the incident light from the horizontal direction to the vertical direction, a protection sheet 15 contacting the light guide 13, a first prism sheet 16 and a second prism sheet 17 set on the protecting sheet (diffuser) 15 and condensing the incident light from the light guide 13 to some direction, a diffuser 18 diffusing the light from the first and second prisms 16 and 17 to a viewing area 21 of the liquid crystal panel 20 with a certain viewing angle, and a first support frame 19 supporting these elements.

Figure 2:
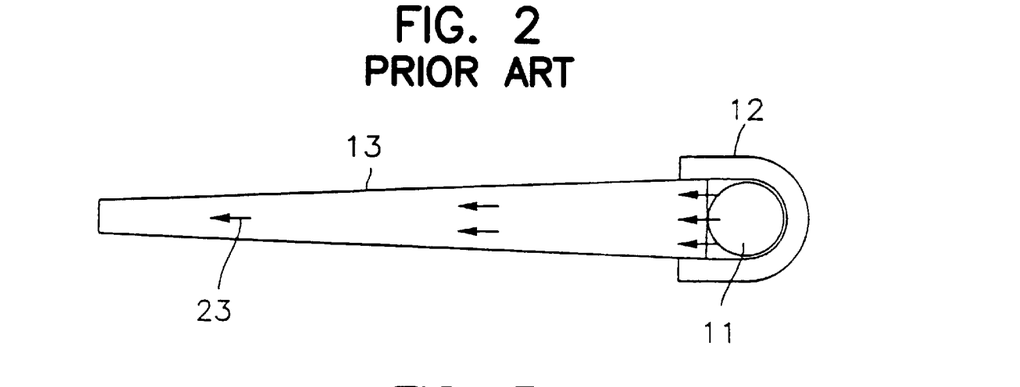
FIG. 2 is a cross-sectional view of a light-guiding plate and a fluorescent lamp.

FIG. 3 shows a cross-sectional view of the light-guiding plate 13 showing a gradual thickness decrease in cross-section as it extends away from the light source 11. A fluorescent lamp 11 as the light source is fixed at a thicker end of the light-guiding plate 13. When the fluorescent lamp 11 is turned on, the light 23 from the source 11 is reflected by the lamp housing 12 surrounding the fluorescent lamp 11. The reflected light transmits through the cross-section towards the other side (thinner end) of the light-guiding plate 13 as indicated by the arrows. Then, the light spreads all over the surface of the light-guiding plate 13 and reaches the display area 21 (FIG. 1) through the diffusion plate 18. At the same time, a thin film transistor formed on the liquid crystal panel controls a corresponding pixel according to the signals from the driving circuit 30 (FIG. 1) to selectively transmit the light which collectively realizes the display of images on the display area.

The liquid crystal display is usually combined with, for example, a notebook computer as an output screen. The following method is used to fix the liquid crystal display to a device such as a notebook computer.

Figure 3A:
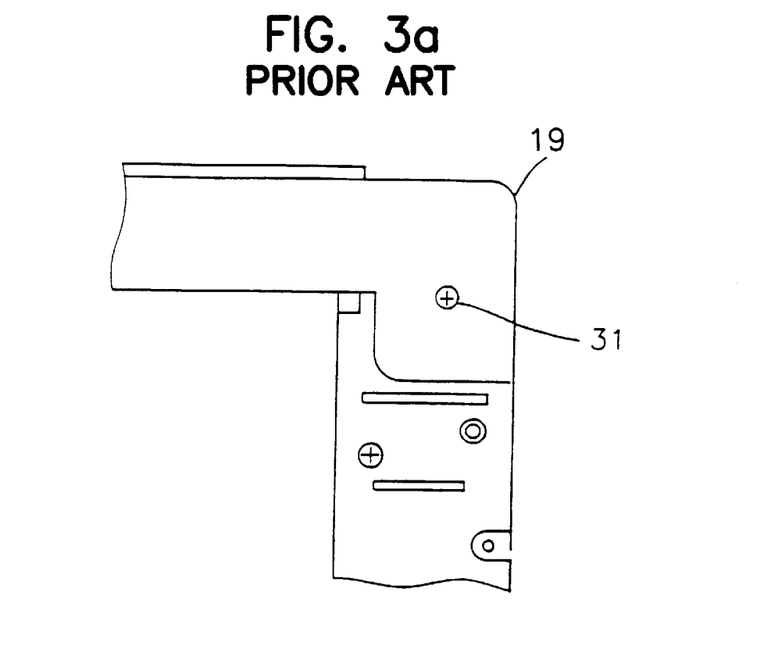
FIG. 3a is a plan view of a liquid crystal display showing a screw frame of a first fastening frame.
Figure 3B:
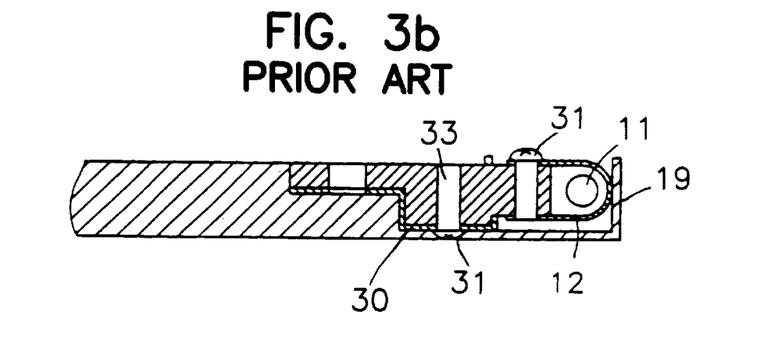
FIG. 3b is a cross-sectional view of a liquid crystal display illustrating a first fastening frame, a lamp housing, and ground support plates fixed together by a screw.

Referring to FIGS. 3a and 3b, in a conventional liquid crystal display, a ground supporting plate 30 is disposed on the first fastening frame 19. A mounting hole 33 is formed through the ground supporting plate 30 and the first fastening frame 19, as shown in FIG. 3b. Then, the ground supporting plate 30 and the first fastening frame 19 are fixed by a screw 31 as shown in FIG. 3a. In other words, a liquid crystal display is fixed to a device such as a notebook computer so as to fasten the first fastening frame 19 and the ground supporting plate 30 by a fastening element such as a screw.

However, the liquid crystal display becomes thicker due to the length of the screw according to the method as shown in FIGS. 3a and 3b. Moreover, since the mounting hole 33 for the screw is formed on the front surface of the liquid crystal display, the display area of the liquid crystal display becomes narrow.

According to the structure described above, the LCD device operates as follows. The light from the luminescent lamp 11 is incident on the rear surface of the liquid crystal panel 20 through the back light unit. A control circuit placed on the driving circuit board 30 controls the incident light on the viewing area 21 of the liquid crystal panel 20 to display images and characters.

Figure 4:
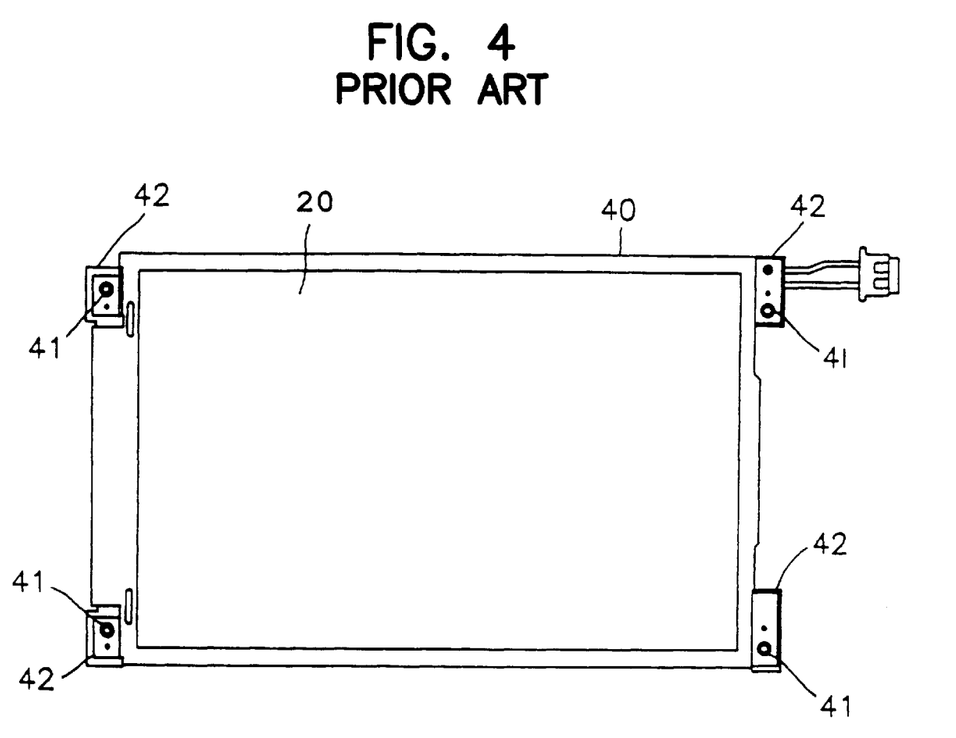
FIG. 4 shows a plan view of the final assembly structure of the liquid crystal panel, support frame, and back light unit in the conventional liquid crystal display device.

FIG. 4 is a drawing showing a plan view of the final assembly structure of the conventional liquid crystal display device. FIG. 4 also shows the assembled result of a second support frame 40, liquid crystal panel 20 and back light unit having an assembly structure for mounting to a portable computer. The second support frame 40 is made of metal or plastic, and holds the liquid crystal panel 20 and the back light unit. Here, the driving circuit board 23 is located behind the rear part of the back light unit connected to the liquid crystal panel 20 with a flexible film (not shown).

Figure 5:
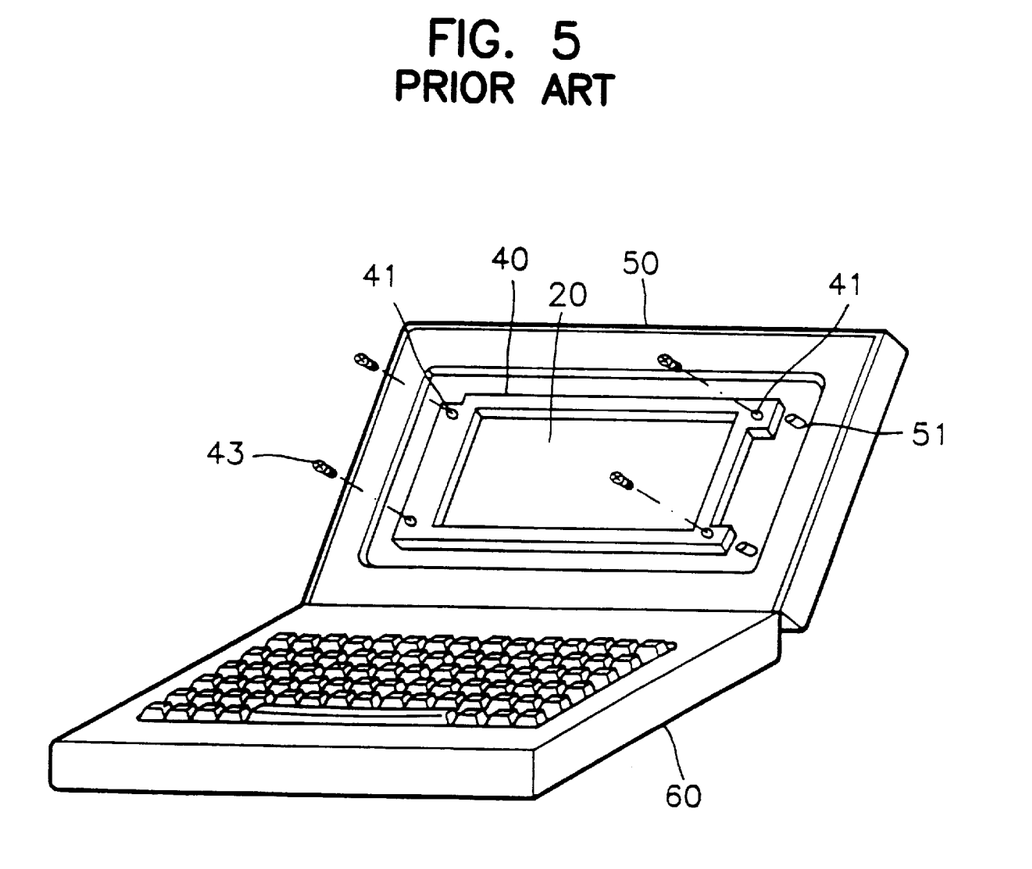
FIG. 5 shows an assembly structure of the liquid crystal display device in the conventional portable computer.

FIG. 5 shows the assembly structure of the liquid crystal panel 20 and body 60 of the portable computer in the conventional method. The second support frame 40 is mounted to a rear case 50 of the portable computer using screws 43 through screw holes 41. A front case (not shown) having a blank area adjusted to the viewing area is joined at the rear case 50. That is, the liquid crystal panel 20 is mounted with the rear case 50 by the screws 43 locked in the normal direction of the display surface through the screw holes 41 formed on that surface. Although not shown in the drawings, the front case is mounted on the LCD device, opening the viewing area 21 and covering the other parts.

In general, as the size of the portable computer is designed for easy movement, the same, goes for an A4 copy sheet, for example. Therefore, the ratio of the viewing area to the whole surface area of the display and the thickness of the display device affect the quality of the portable computer. However, in a conventional portable computer, screw holes 41 are located on edge portions of the display surface in order to join the second support frame 40 to the rear case 50. As the display area has a screw frame area 42 (FIG. 4) for forming the holes 41, the ratio of the area of the LC panel to the viewing area 21 is reduced.

Furthermore, in the conventional portable computer, as the screws 43 are locked to the liquid crystal display device and the rear case 50 in the normal direction of the display surface, the display part is thick enough to form an assembly device 51 for the screws 43, such as screw holes 41. The second support frame 40 is also large enough to have a space for supporting the screw holes 41. Thus, it is difficult to reduce the weight of the portable computer.

Accordingly, a liquid crystal device is needed having a high viewing ratio of the display, low weight, and reduced thickness for a computer, such as a portable computer.

SUMMARY OF THE INVENTION

Accordingly, the present invention is directed to a computer that substantially obviates one or more of the problems due to limitations and disadvantages of the related art.

An object of the present invention is to increase the ratio of the viewing area to the whole area of a computer display.

Another object of the present invention is to provide a thin, light weight display unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device comprises a liquid crystal panel including a display area; a light source joined with the liquid crystal panel; a first frame coupled to a surface of the light unit and sides of the liquid crystal panel; a second frame coupled to edges of the liquid crystal panel and sides of the first support frame; an outer casing; and a fastening part joining together the first support frame, the second support frame, and the outer casing through the sides of the first support frame, the second support frame, and the outer casing.

In another aspect of the present invention, a portable computer comprises a liquid crystal display device having a display surface and a first plurality of side surfaces; a body having an input device; a cover, coupled to an edge of the body, having a second plurality of side surfaces; and a fastening unit attaching the first plurality of side surfaces of the liquid crystal display device to the second plurality of side surfaces of the cover, the liquid crystal display device being mounted to the cover.

In another aspect of the present invention, a portable computer comprises a liquid crystal display device having a first side surface; a body having an input device; a cover joined with the body and having a second side surface; and a fastening unit joining together the liquid crystal display device and the cover through the first and second side surfaces of the liquid crystal display device and the cover, respectively.

In a further aspect of the present invention a liquid crystal display device comprises a first support frame having a first fastening member at a side surface of the first support frame; a reflector unit adjacent the first support frame; a light source adjacent to the reflector unit; a light guide unit adjacent the reflector unit; a protection unit adjacent the light guide unit; a prism unit adjacent the protection unit; a diffuser unit adjacent the prism unit; a liquid crystal panel adjacent the diffuser unit; and a second support frame having a second fastening member at a side surface of the second support frame, wherein the reflector unit, the protection unit, the prism unit, and the diffuser unit, the liquid crystal panel are between the first and second support frame, and the first and second support frame are attached to each other through the first and second fastening members through the side surfaces of the first and second support frames.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 6:
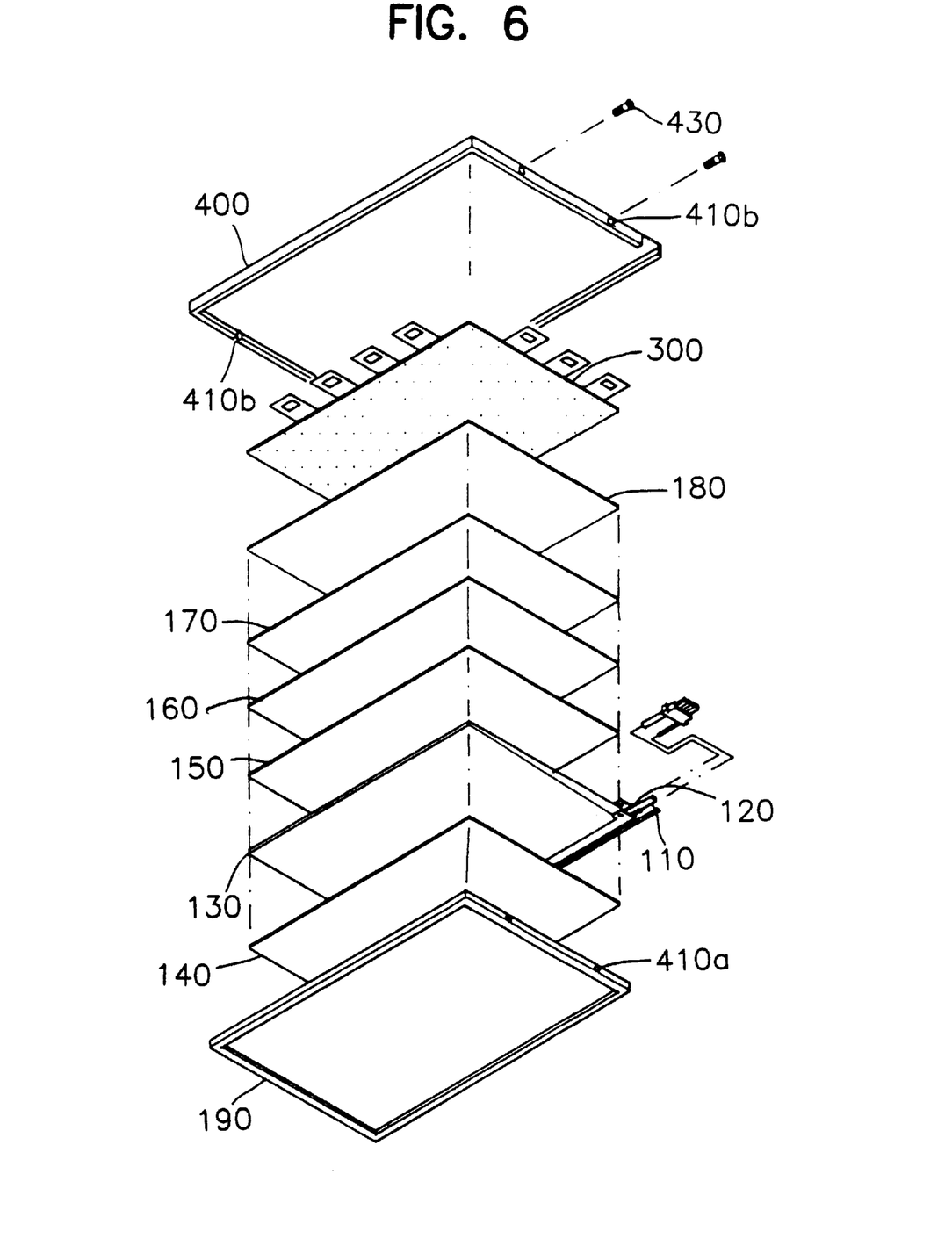
FIG. 6 is a perspective view showing the assembly structure of the parts of the back light unit in accordance with the present invention.
Figure 8:
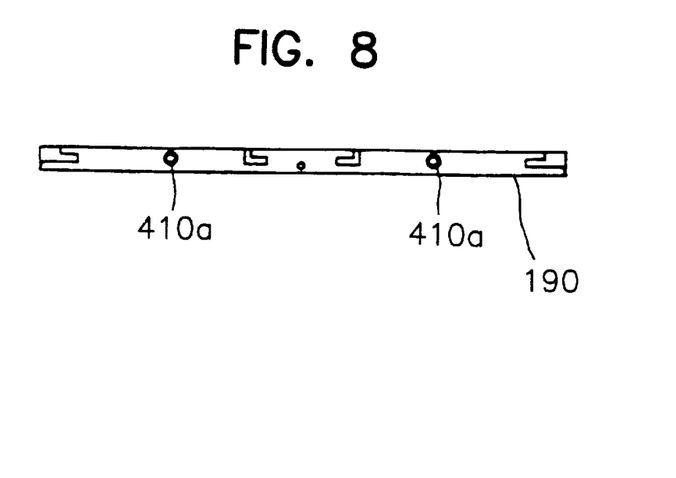
FIG. 8 is a cross-sectional view of a liquid crystal display according to the present invention illustrating mounting holes at a side of the first fastening frame.

The present invention provides a mounting hole for a fastening element on a side of a liquid crystal display instead of on a front surface of a liquid crystal display. For example, FIG. 8 shows a first mounting hole 410*a* formed on a first fastening frame 190. With reference to FIG. 6, the structure of a liquid crystal display according to the present invention will be described in detail.

Referring to FIG. 6, on a first support frame 190 made of plastic, for example, a reflector 140, a light guide 130, a protection sheet 150, a first prism sheet 160, a second prism sheet 170, a diffuser 180, and a liquid crystal panel 300 are stacked sequentially. On the side surface of the first support frame 190, a plurality of first screw holes 410*a* are formed.

At the edge of the light guide 130, a luminescent lamp 110 and a lamp housing 120 are mounted. The lamp housing 120 has an U-shape and surrounds the luminescent lamp 110.

In order to join the first support frame 190, the liquid crystal panel 300, and the lamp housing 120, a second support frame 400 preferably made of metal is mounted at the side surface of the first support frame 190. At the side surface of the second support frame 400, a plurality of second screw holes 410*b* aligned with the first screw holes 410*a* are formed.

Figure 7:
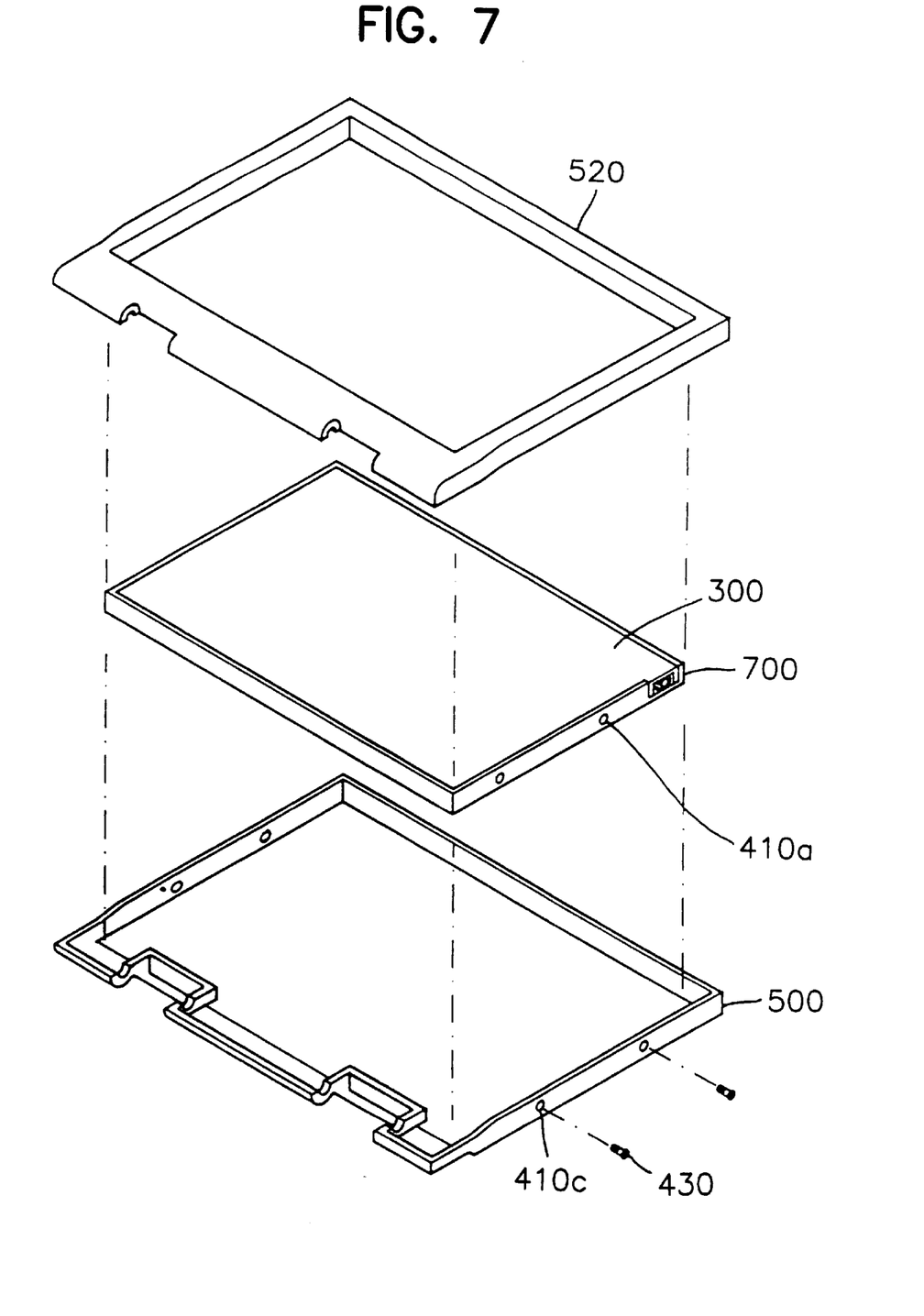
FIG. 7 is a perspective view the assembly structure of the liquid crystal display device, the rear cover, and the front cover in accordance with the present invention.

Referring to FIG. 7, a liquid crystal display device 700 comprising the first support frame 190, the second support frame 400, and the liquid crystal panel 300 is joined with a rear case 500 and a front case 520. At the side surface of the rear case 500, third screw holes 410*c* aligned with second screw holes 410*b* are formed. The rear case 500 and the liquid crystal display device 700 are joined to each other by fastening devices such as screws 430, which are locked to the second and third screw holes 410*b* and 410*c*. Although not shown in the drawings, the screws 430 are also locked with the first screw holes 410*a*.

In another embodiment, in order to join the second support frame 400 and the rear case 500, an adhesive device such as double-sided adhesive tape can be used instead of the second and the third screw holes 410b and 410c. This example has an added advantage in that no screws are needed which makes the manufacturing method easy.

In a further embodiment, the rear case 500 and the second support frame 400 are jointed to each other using hooks and/or other suitable fastening devices including adhesives formed at inner sides of the rear case 500. This embodiment also does not need fastening devices such as screws 430.

Accordingly, in the present invention, the assembling or fastening devices are located at the side surface of the display and not at the front or back side. The assembling devices are preferably screws, hooks or, adhesive materials, for example. The direction of the assembling devices is normal to the side surface of the display, that is, parallel direction with the front (viewing) surface of the display. Moreover, the assembling devices may be formed on the upper and lower sides of the display.

Figure 9:
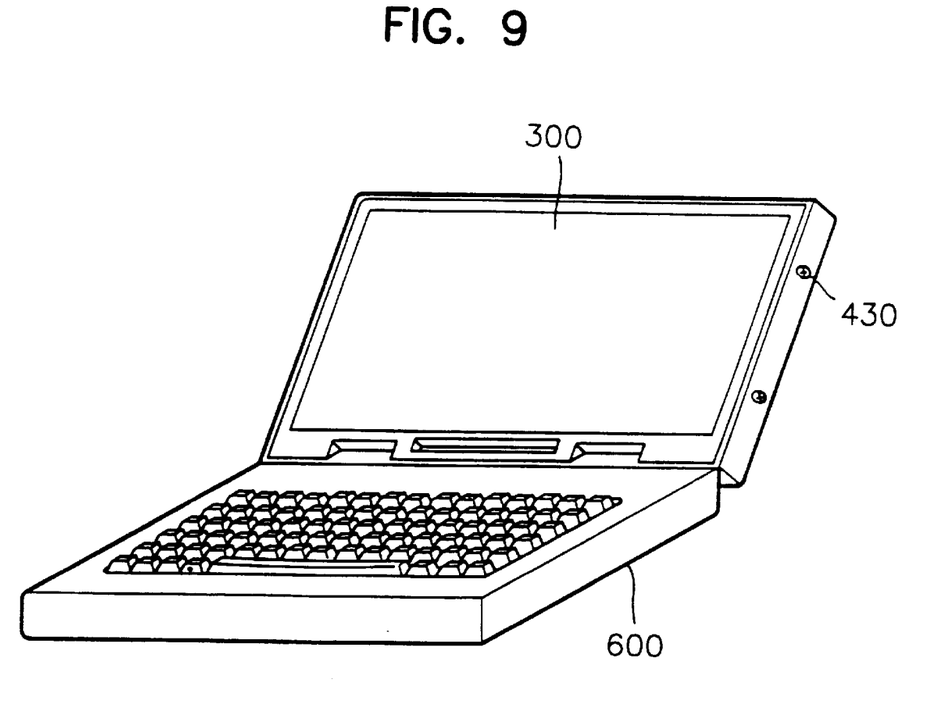
FIG. 9 shows an assembly structure of the liquid crystal display device and portable computer in accordance with the present invention.

Referring to FIG. 9, the liquid crystal display is mounted to the portable computer. One of the advantages of the portable computer according to the present invention over the conventional portable computer is the higher ratio of the viewing area. Because there are no fastening elements on the display surface, the outer frame of the display area of the present invention is narrower than that of conventional ones. Thus, the ratio of the viewing area can be maximized and the thickness of the display part is made thinner than that of conventional ones.

Furthermore, as the volume of the frames of the present invention is smaller than that of conventional ones, the portable computer of the present invention is lighter. Additionally, as it is not necessary to have screws, the cost for manufacturing can be reduced.

It will be apparent to those skilled in the art that various modifications and variations can be made in the computer having liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a first frame;
   a liquid crystal panel adjacent the first frame and having a display surface; and
   a second frame coupled to the first frame and having a fastening part at at least one side edge of the second frame, the side edge being substantially perpendicular to the display surface of the liquid crystal panel;
   wherein the liquid crystal display device is fixable to a housing through the side edge.

2. The liquid crystal display device according to claim 1, wherein the fastening part includes a hole.

3. The liquid crystal display device according to claim 1, wherein the fastening part includes an adhesive material.

4. The liquid crystal display device according to claim 1, wherein the housing includes a portable computer.

5. A liquid crystal display device comprising:
   a liquid crystal panel having a display surface; and
   a frame substantially surrounding edges of the liquid crystal panel, and having a fastening part at at least one side edge of the frame, the frame fixable to a housing through the side edge;
   wherein the side edge is substantially perpendicular to the display surface of the liquid crystal panel.

6. The liquid crystal display device according to claim 5, wherein the fastening part includes a hole.

7. The liquid crystal display device according to claim 5, wherein the fastening part includes an adhesive material.

8. The liquid crystal display device according to claim 5, wherein the housing includes a portable computer.

9. A liquid crystal display device comprising:
   a first frame;
   a reflector unit adjacent to the first frame;
   a light source adjacent to the reflector unit;
   a light guide unit adjacent to the light source;
   a liquid crystal panel adjacent to the light guide unit; and
   a second frame having a fastening part at at least one side edge of the second frame, wherein the reflector unit, light source, the light guide unit and the liquid crystal panel are between the first and second frames, the second frame fixable to a housing through the side edge of the second frame.

10. The liquid crystal display device according to claim 9, wherein the fastening part includes a hole.

11. The liquid crystal display device according to claim 9, wherein the fastening part includes an adhesive material.

12. The liquid crystal display device according to claim 9, wherein the housing includes a portable computer.

13. A liquid crystal display device comprising:
   a liquid crystal panel with a display area and having front and back surfaces and a first plurality of edges;
   a light unit with a second plurality of edges joined with the liquid crystal panel;
   a first support frame supporting the light unit and having a portion that extends parallel to at least one edge of the light unit;
   a second support frame coupled to the portion of the first frame;
   an outer casing; and
   a fastening part joining together the first and second support frames and the outer casing through the portion of the first support frame that is coupled to the second support frame.

14. The liquid crystal display device according to claim 13, wherein the fastening part includes a screw hole.

15. The liquid crystal display device according to claim 13, wherein the portion of the first frame is substantially perpendicular to the viewing surface of the display device.

16. The liquid crystal display device according to claim 13, wherein the first frame supports the light source.

17. The liquid crystal display device according to claim 13, wherein the second support frame protects the liquid crystal panel.

18. A liquid crystal display device comprising:
   a first support frame having a first fastening member at a side edge of the first support frame;
   a reflector unit adjacent the first support frame;
   a light source adjacent to the reflector unit;
   a light guide unit adjacent the reflector unit;
   a prism unit adjacent the light guide unit;
   a liquid crystal panel adjacent the prism unit; and
   a second support frame having a second fastening member at a side edge of the second support frame, wherein the reflector unit, the prism unit, and the liquid crystal panel are between the first and second support frames, and the first and second support frames are attached to each other through the side edges of the first and second support frames.

19. The liquid crystal display device according to claim 18, wherein at least one of the first and second fastening members includes a screw hole.

20. The liquid crystal display device according to claim 18, wherein the side edges of the first and second support frames are substantially perpendicular to the viewing surface of the display device.

21. The liquid crystal display device according to claim 18, wherein the first support frame supports the light source.

22. The liquid crystal display device according to claim 18, wherein the second support frame protects the liquid crystal pane.

23. A liquid crystal display device comprising the steps of:
a first frame;
a liquid crystal panel adjacent the first frame and having a display surface; and
a second frame coupled to the first frame, and having a fastening part at at least one side edge of the second frame, the side edge being substantially perpendicular to the display surface of the liquid crystal panel;
wherein the liquid crystal display device is attachable to a housing through the side edge.

24. The liquid crystal display device according to claim 23, wherein the fastening part includes a hole.

25. The liquid crystal display device according to claim 23, wherein the fastening part includes an adhesive material.

26. The liquid crystal display device according to claim 23, wherein the housing includes a portable computer.

27. The liquid crystal display device according to claim 23, wherein the liquid crystal display device is immovable within the housing.

28. The liquid crystal display device according to claim 23, wherein the fastening part includes a screw attaching the liquid crystal display device to the housing by passing through at least one hole.

29. The liquid crystal display device according to claim 23, wherein the fastening part includes first and second screws passing through first and second holes at a same side edge of at least one of the first and second frames.

30. The liquid crystal display device according to claim 23, wherein the fastening part includes an adhesive material.

31. The liquid crystal display device according to claim 23, wherein the liquid crystal display device is immovable within the housing and the fastening part includes a screw passing through at least one hole in at least one of the first and second frames.

32. The liquid crystal display device according to claim 31, wherein the fastening part includes a second screw passing through a second hole in at least one of the first and second frames at a same side.

33. A liquid crystal display device comprising:
a liquid crystal panel having a display surface; and
a frame substantially surrounding edges of the liquid crystal panel, and having a fastening part at at least one side edge of the frame, the frame attachable to a housing through the side edge;
wherein the side edge is substantially perpendicular to the display surface of the liquid crystal panel.

34. The liquid crystal display device according to claim 33, wherein the fastening part includes a hole.

35. The liquid crystal display device according to claim 33, wherein the fastening part includes an adhesive material.

36. The liquid crystal display device according to claim 33, wherein the housing includes a portable computer.

37. A liquid crystal display device comprising:
a first frame;
a reflector unit adjacent to the first frame;
a light source adjacent to the reflector unit;
a light guide unit adjacent to the light source;
a liquid crystal panel adjacent to the light guide unit; and
a second frame having a fastening part at at least one side edge of the second frame, wherein the reflector unit, light source, the light guide unit and the liquid crystal panel are between the first and second frames, the second frame attachable to a housing through the side edge of the second frame.

38. The liquid crystal display device according to claim 37, wherein the fastening part includes a hole.

39. The liquid crystal display device according to claim 37, wherein the fastening part includes an adhesive material.

40. The liquid crystal display device according to claim 37, wherein the housing includes a portable computer.

41. The liquid crystal display device according to claim 33, wherein the liquid crystal device is immovable within the housing.

42. The liquid crystal display device according to claim 41, wherein the fastening part includes a screw passing through at least one hole.

43. The liquid crystal display device according to claim 33, wherein the fastening part includes first and second screws passing through first and second holes at a same side edge of the frame.

44. The liquid crystal display device according to claim 33, wherein the fastening part includes an adhesive material.

45. The liquid crystal display device according to claim 33, wherein the liquid crystal display device is immovable within the housing and the fastening part includes a screw passing through at least one hole in the frame.

46. The liquid crystal display device according to claim 45, wherein the fastening part includes a second screw passing through a second hole in the frame at a same side.

47. The liquid crystal display device according to claim 37, wherein the liquid crystal display device is immovable within the housing.

48. The liquid crystal display device according to claim 47, wherein the fastening part includes a screw passing through at least one hole.

49. The liquid crystal display device according to claim 37, wherein the fastening part includes first and second screws passing through first and second holes at a same side edge of at least one of the first and second frames.

50. The liquid crystal display device according to claim 37, wherein the fastening part includes an adhesive material.

51. The liquid crystal display device according to claim 37, wherein the liquid crystal display device is immovable within the housing and the fastening part includes a screw passing through at least one hole in at least one of the first and second frames.

52. The liquid crystal display device according to claim 51, wherein the fastening part includes a second screw passing through a second hole in the at least one of the first and second frames at a same side.

* * * * *

(12) EX PARTE REEXAMINATION CERTIFICATE (8297th)
United States Patent
Yun et al.

(10) Number: US 6,002,457 C1
(45) Certificate Issued: Jun. 7, 2011

(54) COMPUTER HAVING LIQUID CRYSTAL DISPLAY

(75) Inventors: Hee Young Yun, Kumi (KR); Kyo Hun Moon, Kimcheon (KR); Byeong Yun Lee, Suwon (KR); Yong Bum Kim, Kumi (KR); Young Un Bang, Ansan (KR)

(73) Assignee: LG. Philips LCD Co., Ltd., Youngbungpo-Ku, Seoul (KR)

Reexamination Request:
No. 90/008,145, Aug. 3, 2006

Reexamination Certificate for:
Patent No.: 6,002,457
Issued: Dec. 14, 1999
Appl. No.: 09/178,832
Filed: Oct. 26, 1998

Related U.S. Application Data (63) Continuation of application No. 08/888,164, filed on Jul. 3, 1997, now Pat. No. 5,835,139.

(30) Foreign Application Priority Data

Apr. 8, 1997 (KR) .............................. 97-12899
Apr. 17, 1997 (KR) ............................. 97-14278

(51) Int. Cl.
*G06F 1/16* (2006.01)
*G06F 1/13* (2006.01)

(52) U.S. Cl. .............................. 349/58; 349/1
(58) Field of Classification Search .................. None
See application file for complete search history.

(56) References Cited

U.S. PATENT DOCUMENTS

| | | | |
|---|---|---|---|
| 4,105,608 A | 8/1978 | Nakamura et al. |
| 4,111,533 A | 9/1978 | Nakamura et al. |
| 4,422,728 A | 12/1983 | Andreaggi |
| 4,755,035 A | 7/1988 | Kopish et al. |
| 4,781,422 A | 11/1988 | Kimble |
| 4,796,977 A | 1/1989 | Drake |
| 4,937,709 A | 6/1990 | Yanagi et al. |
| 4,959,887 A | 10/1990 | Gruenberg et al. |
| 5,002,368 A | 3/1991 | Anglin |
| 5,102,084 A | 4/1992 | Park |

(Continued)

FOREIGN PATENT DOCUMENTS

| | | |
|---|---|---|
| DE | 41 20 950 | 12/1992 |
| EP | 0 317 261 | 5/1989 |
| EP | 0 425 793 | 5/1991 |
| EP | 0 454 120 | 10/1991 |
| EP | 0 532 284 | 3/1993 |
| EP | 0 587 144 | 3/1994 |
| EP | 0 604 872 | 7/1994 |
| EP | 0 620 473 | 10/1994 |
| EP | 0 880 049 A1 | 11/1998 |
| EP | 1 052 536 A3 | 2/2001 |

(Continued)

OTHER PUBLICATIONS

"Nikkei Microdevice Special Issue Flat Panel Display 1997", Dec. 12, 1996 at p. 49.
English language translation dated Apr. 9, 1999 of attachment to Japanese Patent Appln. H09–135610, (17 pgs.).

*Primary Examiner*—Woo H. Choi (57) ABSTRACT

A liquid crystal display device includes a liquid crystal panel having a display area, a light source joined with the liquid crystal panel, a first frame coupled to a surface of the light unit and sides of the liquid crystal panel, a second frame coupled to edges of the liquid crystal panel and sides of the first support frame, an outer casing, and a fastening part joining together the first support frame, the second support frame, and the outer casing through the sides of the first support frame, the second support frame, and the outer casing.

U.S. PATENT DOCUMENTS

| | | | |
|---|---|---|---|
| 5,103,377 A | 4/1992 | Kobayashi et al. | |
| 5,168,426 A | 12/1992 | Hoving et al. | |
| 5,173,837 A | 12/1992 | Blackwell et al. | |
| 5,195,213 A | 3/1993 | Ohgami et al. | |
| 5,233,502 A | 8/1993 | Beatty et al. | |
| 5,238,421 A | 8/1993 | Kobayashi | |
| 5,264,992 A | 11/1993 | Hogdahl et al. | |
| 5,268,816 A | 12/1993 | Abell, Jr. et al. | |
| 5,268,817 A | 12/1993 | Miyagawa et al. | |
| 5,276,589 A | 1/1994 | Bartlett et al. | |
| 5,313,318 A | 5/1994 | Gruenberg et al. | |
| 5,328,379 A | 7/1994 | Kobayashi | |
| 5,363,227 A | 11/1994 | Ichikawa et al. | |
| 5,379,182 A | 1/1995 | Fujimori et al. | |
| 5,422,751 A | 6/1995 | Lewis et al. | |
| 5,432,626 A | 7/1995 | Sasuga et al. | |
| 5,467,106 A | 11/1995 | Salomon | |
| 5,467,504 A | 11/1995 | Yang | |
| 5,479,285 A | 12/1995 | Burke | |
| 5,486,942 A | 1/1996 | Ichikawa et al. | |
| 5,494,447 A | 2/1996 | Zaidan | |
| 5,504,605 A | 4/1996 | Sakuma et al. | |
| 5,559,670 A | 9/1996 | Flint et al. | |
| 5,566,048 A | 10/1996 | Esterberg et al. | |
| 5,568,357 A | 10/1996 | Kochis et al. | |
| 5,570,267 A | 10/1996 | Ma | |
| 5,619,351 A | 4/1997 | Funamoto et al. | |
| 5,634,351 A | 6/1997 | Larson et al. | |
| 5,636,101 A | 6/1997 | Bonsall et al. | |
| 5,636,102 A | 6/1997 | Fujino et al. | |
| 5,644,516 A | 7/1997 | Podwalny et al. | |
| 5,654,779 A | 8/1997 | Nakayama et al. | |
| 5,666,172 A | 9/1997 | Ida et al. | |
| 5,666,261 A * | 9/1997 | Aguilera | 361/681 |
| 5,680,183 A | 10/1997 | Sasugar et al. | |
| 5,682,645 A | 11/1997 | Watabe et al. | |
| 5,717,566 A | 2/1998 | Tao | |
| 5,771,539 A | 6/1998 | Wahlstedt et al. | |
| 5,777,704 A | 7/1998 | Selker | |
| 5,815,225 A | 9/1998 | Nelson | |
| 5,825,613 A | 10/1998 | Holden | |
| 5,835,139 A | 11/1998 | Yun et al. | |
| 5,872,606 A | 2/1999 | Kim | |
| 5,872,704 A | 2/1999 | Kim | |
| 5,872,760 A | 2/1999 | Kim | |
| 5,905,550 A | 5/1999 | Ohgami et al. | |
| 5,926,237 A | 7/1999 | Yun et al. | |
| 6,002,457 A | 12/1999 | Yun et al. | |
| 6,002,582 A | 12/1999 | Yeager et al. | |
| 6,020,942 A | 2/2000 | Yun et al. | |
| 6,064,565 A | 5/2000 | Ishihara et al. | |
| 6,144,423 A | 11/2000 | Kim | |
| 6,304,432 B1 | 10/2001 | Kim | |
| 6,330,148 B1 | 12/2001 | Won et al. | |
| 6,373,537 B2 | 4/2002 | Yun et al. | |
| 6,411,501 B1 | 6/2002 | Cho | |
| 6,498,718 B1 | 12/2002 | Kim et al. | |
| 6,501,641 B1 | 12/2002 | Kim et al. | |
| 6,512,558 B2 | 1/2003 | Kim | |
| 6,618,240 B1 | 9/2003 | Kim | |
| 6,693,794 B2 | 2/2004 | Kim | |
| 6,838,810 B1 | 1/2005 | Bovio et al. | |
| 2003/0189681 A1 | 10/2003 | Han et al. | |

FOREIGN PATENT DOCUMENTS

| | | |
|---|---|---|
| GB | 2 305 689 | 4/1997 |
| GB | 2 305 690 | 4/1997 |
| JP | S52-045367 | 9/1977 |
| JP | S59-020273 | 2/1984 |
| JP | S62-137479 | 8/1987 |
| JP | S62-269931 | 11/1987 |
| JP | H01-059223 | 4/1989 |
| JP | H01-094983 | 4/1989 |
| JP | H01-211721 | 8/1989 |
| JP | H01-237591 | 9/1989 |
| JP | H02-079893 | 3/1990 |
| JP | H02-083573 | 6/1990 |
| JP | H02-244190 | 9/1990 |
| JP | H03-006670 | 1/1991 |
| JP | H03-156488 | 7/1991 |
| JP | H03-200282 A | 9/1991 |
| JP | H04-020086 | 2/1992 |
| JP | H04-051595 | 2/1992 |
| JP | H04-056822 A | 2/1992 |
| JP | H05-042853 A | 2/1993 |
| JP | H05-080344 | 4/1993 |
| JP | H05-050428 | 7/1993 |
| JP | H06-021018 | 3/1994 |
| JP | H03 001011 | 6/1994 |
| JP | H06-348364 | 12/1994 |
| JP | H07-199180 | 8/1995 |
| JP | H07-261187 | 10/1995 |
| JP | H07-281184 | 10/1995 |
| JP | H07-044577 | 11/1995 |
| JP | H07-044579 | 11/1995 |
| JP | 7099394 | 11/1995 |
| JP | H08-211964 | 8/1996 |
| JP | H09-026753 | 1/1997 |
| JP | H09-146466 | 6/1997 |
| JP | H09-199875 | 7/1997 |
| JP | H09-297542 | 11/1997 |
| JP | H09-311319 | 12/1997 |
| JP | H10-301095 | 11/1998 |
| KR | 2003-0080125 | 10/2003 |
| KR | 2003-0080126 | 10/2003 |
| WO | WO 96/27147 | 9/1996 |

* cited by examiner

EX PARTE
REEXAMINATION CERTIFICATE
ISSUED UNDER 35 U.S.C. 307

THE PATENT IS HEREBY AMENDED AS
INDICATED BELOW.

AS A RESULT OF REEXAMINATION, IT HAS BEEN DETERMINED THAT:

The patentability of claims 13-17 is confirmed.

Claims 1-12 and 18-52 are cancelled.

* * * * *